May 19, 1959 T. T. BROWN 2,887,581
AUTOMATIC TUNING SYSTEMS
Filed May 6, 1957
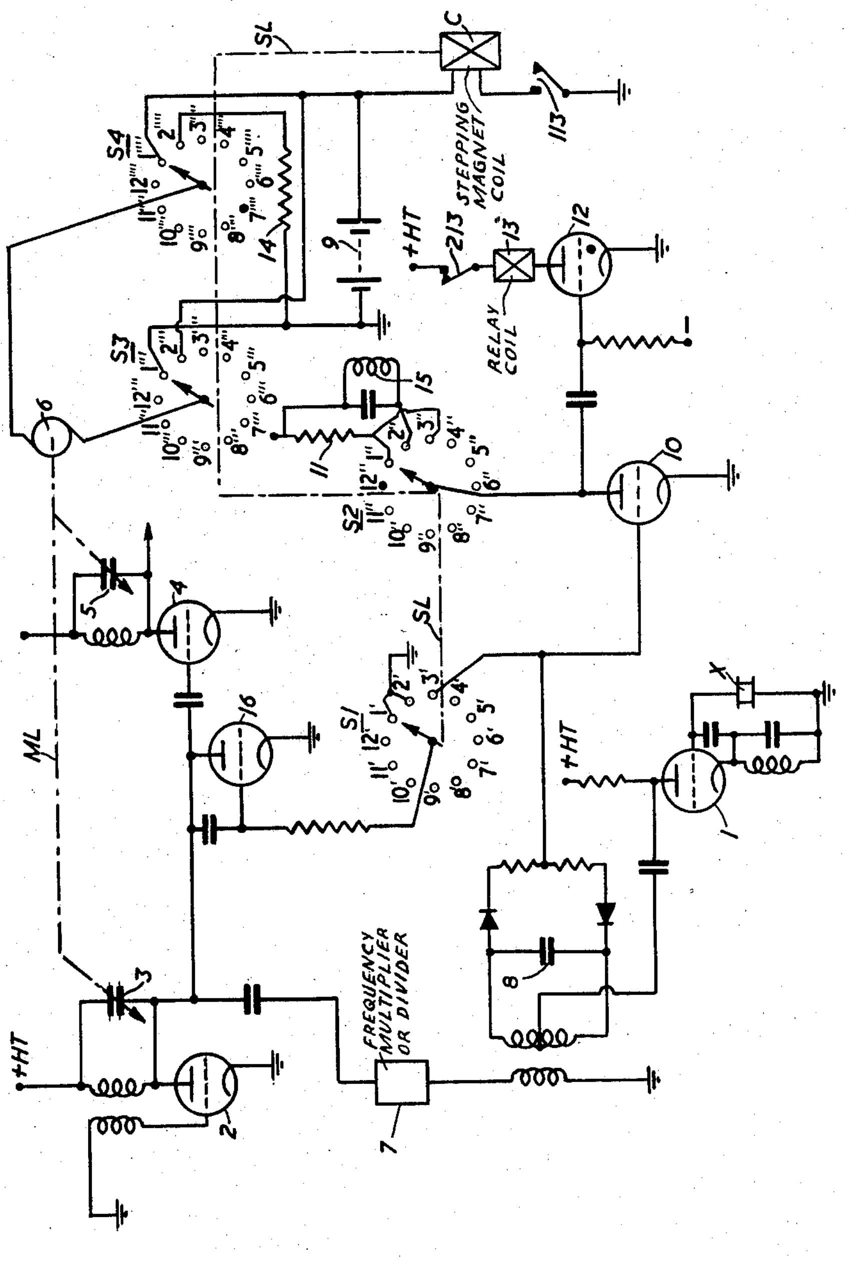
INVENTOR:
Thomas Theodore Brown
BY:
Baldwin & Wight
ATTORNEYS United States Patent Office 2,887,581

Patented May 19, 1959

2,887,581

AUTOMATIC TUNING SYSTEMS

Thomas Theodore Brown, Epping, England, assignor to Marconi's Wireless Telegraph Company Limited, London, England, a company of Great Britain Application May 6, 1957, Serial No. 657,383

Claims priority, application Great Britain June 14, 1956

4 Claims. (Cl. 250—36)

This invention relates to automatic tuning systems and is applicable wherever it is required automatically to tune an oscillation generator to be in pre-determined frequency relationship (commonly, though not necessarily, the relationship of frequency equality) with a control frequency. Although not limited to its application thereto the invention is particularly well adapted for the automatic tuning of the local oscillator of an airborne radio transmitter.

An operating requirement of many airborne radio transmitters is that of being self-tuning to a given frequency, usually one of a large number of selectable crystal-determined frequencies. Such a transmitter usually includes an oscillation generator which is automatically tuned through its range of frequencies till it finds a control frequency upon which it then locks itself. There are a number of known automatic tuning systems designed to operate in this way but, in general, such systems are complex, expensive and/or slow in operation. Many of them depend upon the use of complex relay systems, failure of any one of which may cause failure of operation. In many cases, especially in the case of airborne equipment where there may be a great number of selectable control frequencies, known systems tend to become very complex indeed. Any advance in the direction of simplicity is therefore of great advantage.

According to this invention an automatic tuning system for automatically tuning an oscillation generator into pre-determined frequency relationship with a control frequency comprises means for beating together frequencies derived respectively from the generator and from the control frequency source and in such relation thereto that the resultant beat frequency is zero when the generated and control frequencies are in said pre-determined relationship, motor means for adjusting the generator frequency rapidly in one direction through its range of adjustment, means responsive to the occurrence of a beat frequency of relatively low value for reversing said motor means and causing the same to run at a relatively slow speed in the reverse direction, and means responsive to the occurrence during the reverse running of said motor of a beat frequency of pre-determined low value for stopping said motor means and controlling the frequency of the generator by an electronically controlled reactance controlled by the produced beat frequency and included in a frequency determining circuit of said generator.

In a preferred embodiment of the invention an automatic tuning system comprises an oscillation generator to be controlled, a variable reactance device in a frequency determining circuit of said generator, a source of control frequency, a frequency discriminator circuit, means for applying a frequency proportioned to the generator frequency and a frequency proportional to the control frequency to said discriminator circuit, a motor driving said variable reactance device, a reversing switch arrangement adapted in one position to control said motor to drive said device in one direction at one speed and in its other position to control said motor to drive said device in the opposite direction at a slower speed, means responsive to the occurrence of a beat frequency of relatively low value in the output of said discriminator circuit for changing over said switch arrangement from said one position to said other position and also inserting a circuit resonant at a pre-determined low value in a circuit fed with the beat frequency, and means actuated upon response of said resonant circuit for stopping said motor and connecting a reactance valve controlled by the beat frequency to insert control reactance in a frequency determining circuit of the generator.

Preferably the reversing switch arrangement is operated by the current through a discharge tube to which output from the discriminator circuit is fed and the channel between said discriminator circuit and said discharge tube is normally aperiodic but is switched to include the resonant circuit when the motor direction is reversed.

The discharge tube may be a grid controlled gas discharge tube and the channel thereto includes a normally aperiodic amplifier circuit switch-controlled to include the resonant circuit when the motor is reversed.

Preferably also the switching changes are effected by step-by-step switches driven together and providing a first step in which the motor runs forward and the channel to the discharge tube is aperiodic, a second step in which the motor runs in the reverse direction and the channel includes the resonant circuit, a third step in which the motor is stopped, the said channel is again aperiodic and the electronically controlled reactance is connected to control the generator frequency and further steps cyclically repeating the aforesaid three steps.

The invention is illustrated in the accompanying drawing which shows diagrammatically a preferred embodiment.

In the arrangement shown in the drawing, the switching changes are effected by a cyclically operating step-by-step magnet actuated switch comprising four so-called "switch wafers" each with twelve positions and all driven together by the one magnet. As will be seen later the invention does not require that each wafer shall have twelve contacts, but step-by-step switches with this number of contacts per wafer are commercially available and convenient for use in carrying out the invention, and accordingly in the drawing twelve contact wafers are shown. The step-by-step switch in question is actuated by an operating magnet coil C and has four wafers designated respectively S1, S2, S3 and S4, the contacts of which are numbered clockwise 1 to 12. The moving contacts of the four wafers are shown as radial pointers and are driven together, being advanced by one contact each time the coil C is energized. The common drive from the magnet is represented by the chain line SL. In the drawing connections are shown only to contacts 1′, 2′ and 3′ in wafer S1; 1″, 2″ and 3″ in wafer S2; and 1‴ and 2‴ in wafer S3 and 1⁗ and 2⁗ of wafer S4. In both wafers S3 and S4 contact 3‴ and 3⁗ are left blank. In all four wafers, however, the connections are cyclically repeated; that is to say in each case contact 1′ is connected to contacts 4′, 7′ and 10′; contact 2′ is connected to contacts 5′, 8′ and 11′; and contact 3′ is connected to contacts 6′, 9′ and 12′. In order not to complicate the drawing, however, these "repeating" connections are not shown and contacts 4′ to 12′ inclusive are all shown as though they were unconnected. Although reference has been made to the contacts of wafer S1 it will be understood that this description applies uniformly to the contacts of each of the wafer switches.

The control frequency is provided by a stabilized source including the valve 1 in the form of a well-known piezo-electrically controlled oscillator. Only one crystal X is shown, but it will be understood that in practice there will be a considerable number of selectable crystals giving different selectable control frequencies. The generator to be controlled includes the valve 2 and is tuned by a variable condenser 3. It supplies its output to a power amplifier including valve 4 and having a tuned circuit which is tuned by the variable condenser 5. The two variable condensers are driven together by an electric motor 6 as indicated by the chain line ML.

The four wafers are shown in the positions they will have before a tuning operation starts, i.e. all on contacts 1'—1'''' with the condensers 3 and 5 in some random position well away from the correct tuning position. On starting a tuning operation by closing a switch (not shown) output from the generator valve 2, if necessary changed in frequency by a frequency multiplier or divider 7 of fixed factor, is fed to a known discriminator circuit 8 to which is also applied the output from the stabilized source 1. The factor of the amplifier or divider is such that when the generator 2 is correctly tuned, i.e. in the desired pre-determined relationship with the frequency from the valve 1 (if this relationship is that of equality the multiplier or divider 7 will not be required) the beat frequency which appears in the discriminator 8 will be zero and there will be zero output. Since the generator 2 is presumed to be widely off tune the beat frequency will be of very high value. With the switches in the position shown, the motor 6 is energized from a source 9 through the first contacts of wafers 3 and 4 so that it runs at high speed driving the condensers 3 and 4 in one direction through their range of adjustment. As the correct tuning position is approached the beat frequency becomes lower until a low frequency-audio frequency-beat output appears from the discriminator 8. This is amplified by the amplifier 10 which in the present position of wafer S2 is an effectively aperiodic amplifier having a resistance 11 in its anode circuit. The voltage pulse produced by the audio beat frequency at the anode of the valve 10 triggers a gas discharge tube (thyratron) 12 which energizes a relay coil 13 in its anode circuit. Energization of the coil 13 closes normally open contacts 113 and, a short time later, opens normally closed contacts 213. The closing of contacts 113 energizes the magnet coil C which steps up all four wafers to their second position. The slightly later opening of contacts 213 extinguishes the thyratron.

As will be seen from the diagram the changing over of wafers S3 and S4 to their second positions reverses the direction of rotation of the motor 6, the energizing circuit of the motor now including a resistance 14 so that said motor now runs in the reverse direction at slow speed. Owing to its previous high speed running in the forward direction it will have "overshot" the correct tuning position and now moves slowly back towards it. The stepping up of wafer S1 to its second position has made no change in the circuit connections since contacts 1' and 2' of this wafer are connected together. The corresponding change in wafer S2 replaces the resistance 11 in the anode circuit of the valve 10 by a resonant circuit 15 resonant at a pre-determined low frequency, for example at 5 kc./s. lower than the beat frequency produced at reversal of the motor. As the motor 6 brings the condensers 3 and 5 once more towards the position of correct tuning, the audio beat note from the discriminator 8 drops and when it falls at or about to the value of 5 kc./s. the thyratron is triggered again, the coil C energized again and the four wafers stepped up to their third contacts. This disconnects the motor entirely at wafers S3 and S4 and the motor accordingly stops. Wafer S2 takes the tuned circuit 15 again out of circuit re-inserting the resistance 11 and wafer S1 connects the grid of a reactance valve 16 in the frequency determining circuit of the generator 2 to the output of the discriminator 8. The generator valve 2 is now phase locked to the stabilized source 1 and the control exerted by the reactance valve 16 will maintain substantially zero beat in the output from the discriminator 8. In normal practice the control range of the reactance valve will be about 50 kc./s. If, due to any circumstance, the oscillator should drift beyond the control of the reactance valve, a low frequency beat note will again appear from the discriminator 8, the thyratron 12 will again be triggered, the wafer switch will step up all its wafers to their fourth positions and the sequence of operations will recommence.

The invention is, of course, not limited to the precise circuit shown. For example, the thyratron could be replaced by a so-called hard valve and associated integrating circuit, in which case the wafer S2 would be dispensed with.

I claim:

1. In combination in an automatic tuning system, an oscillator generator to be controlled in frequency, a variable reactance device in a frequency determining circuit of said generator, a source of control frequency, a frequency discriminator circuit, means for applying a frequency proportional to the generator frequency and a frequency proportional to the control frequency to said discriminator circuit, a motor driving said variable reactance device, a reversing switch arrangement adapted in one position to control said motor to drive said device in one direction at one speed and in its other position to control said motor to drive said device in the opposite direction at a slower speed, means responsive to the occurrence of a beat frequency of relatively low value in the output of said discriminator circuit for changing over said switch arrangement from said one position to said other position and also inserting a circuit resonant at a pre-determined low value in a circuit fed with the beat frequency, and means actuated upon response of said resonant circuit for stopping said motor and connecting a reactance valve controlled by the beat frequency to insert control reactance in a frequency determining circuit of the generator.

2. Apparatus as set forth in claim 1 wherein the reversing switch arrangement is operated by the current through a discharge tube to which the output from the discriminator circuit is fed and the channel between said discriminator circuit and said discharge tube is normally aperiodic but is switched to include the resonant circuit when the motor direction is reversed.

3. Apparatus as set forth in claim 1 wherein the reversing switch arrangement is operated by the current through a discharge tube to which the output from the discriminator circuit is fed and the channel between said discriminator circuit and said discharge tube is normally aperiodic but is switched to include the resonant circuit when the motor direction is reversed, and wherein the discharge tube is a grid controlled gas discharge tube and the channel thereto includes a normally aperiodic amplifier circuit switch-controlled to include the resonant circuit when the motor is reversed.

4. Apparatus as set forth in claim 1 wherein the reversing switch arrangement is operated by the current through a discharge tube to which the output from the discriminator circuit is fed and the channel between said discriminator circuit and said discharge tube is normally aperiodic but is switched to include the resonant circuit when the motor direction is reversed and wherein the switching changes are effected by step-by-step switches driven together and providing a first step in which the motor runs forward and the channel to the discharge tube is aperiodic, a second step in which the motor runs in the reverse direction and the channel includes the resonant circuit, a third step in which the motor is stopped, the said channel is again aperiodic and the control reactance is connected to control the generator frequency and further steps cyclically repeating the aforesaid three steps.

References Cited in the file of this patent

UNITED STATES PATENTS

| | | |
|---|---|---|
| 2,438,009 | Kinn et al. | Mar. 16, 1948 |
| 2,704,329 | Law | Mar. 15, 1955 |